Nov. 13, 1928.
S. B. GORBUTT
1,691,346
TWO-SPEED POWER TAKE-OFF
Filed April 6, 1927     2 Sheets-Sheet 1
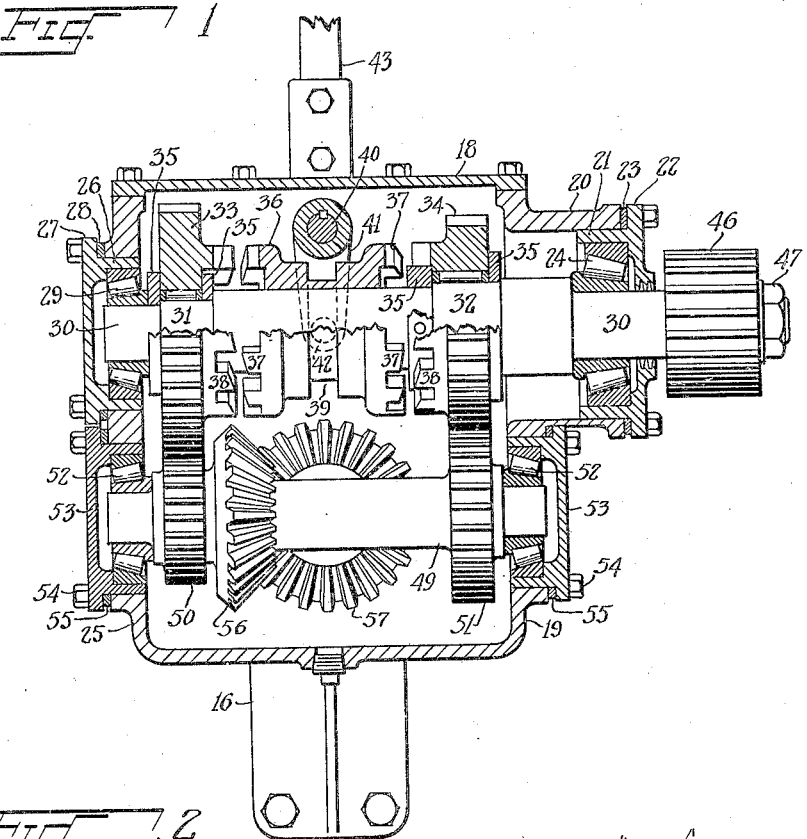

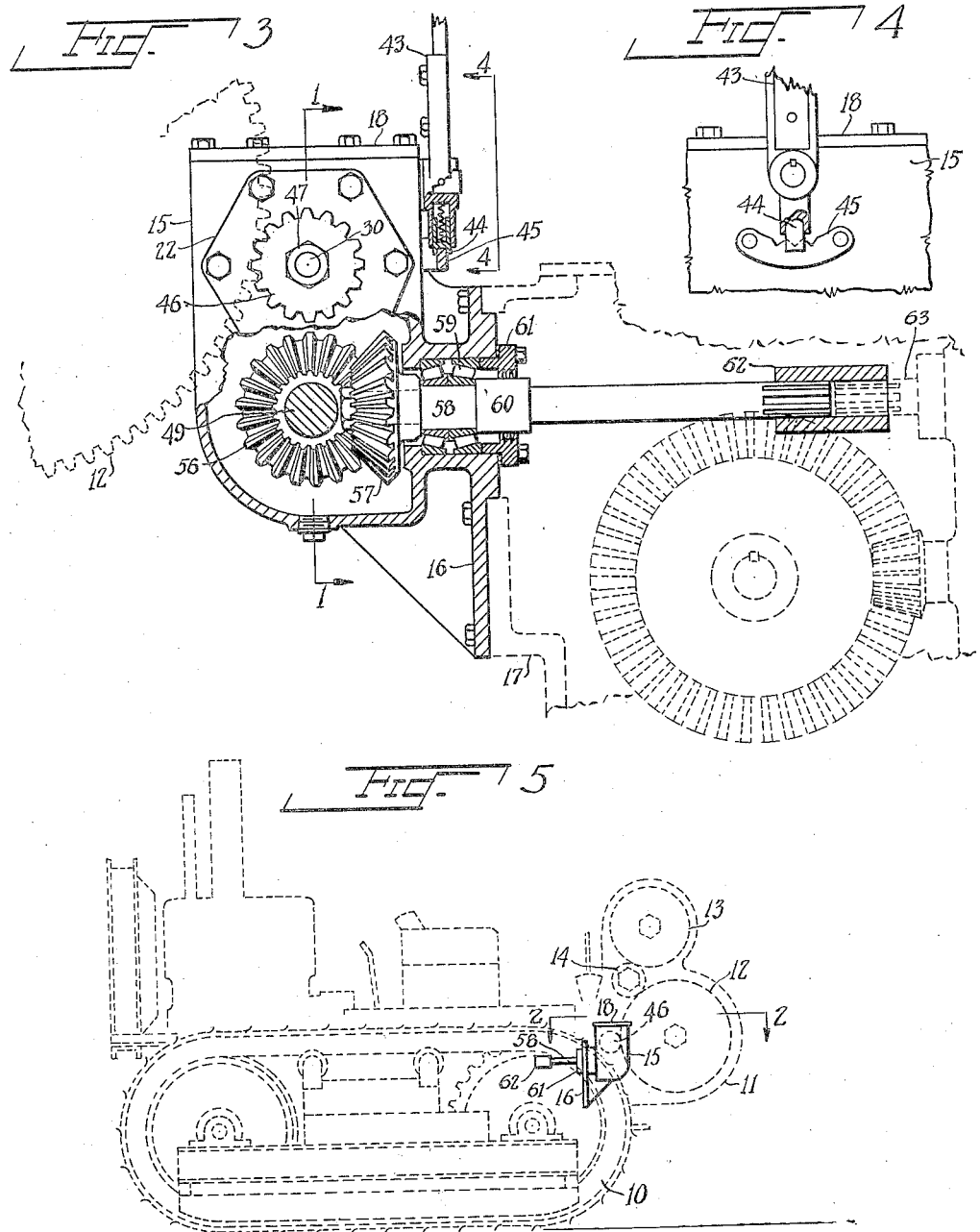

Patented Nov. 13, 1928.

UNITED STATES PATENT OFFICE.

1,691,346

SIDNEY B. GORBUTT, OF PORTLAND, OREGON, ASSIGNOR TO WILLAMETTE IRON AND STEEL WORKS, OF PORTLAND, OREGON.

TWO-SPEED POWER TAKE-OFF.

Application filed April 6, 1927. Serial No. 181,383.

This invention relates generally to portable self-propelled vehicles, and particularly to such vehicles as may be required to furnish power for other work than that of propelling the vehicle.

The first object of this invention is to provide an exceedingly simple and efficient power take off mechanism which will provide two different speeds and a neutral position of the gearing with the employment of a minimum number of parts and securing a maximum amount of rigidity.

The second object is to so construct the device that it is easily attachable to existing types of machines with only a minimum amount of labor.

The third object is to so construct same as to eliminate the necessity of an extra clutch between the power shaft and the driven machine.

These, and other objects, will become more apparent from the specification following as illustrated in the accompanying drawings, in which:

Figure 1 is a vertical section of the device taken along the line 1—1 in Figure 3. Figure 2 is a plan of the device showing its relation to a common type of a track-laying tractor and cable drum which has been mounted on same and which is to be driven through the power take off. Figure 3 is an enlarged side view of the device showing its manner of attaching same to the power shaft and the tractor frame with portions of the power take off case broken away in section. Figure 4 is a fragmentary elevation of the control lever taken along the line 4—4 in Figure 3. Figure 5 is a side elevation of a tractor showing the position of the hoisting drum and the relation which the power take off bears to these two elements.

Similar numbers of reference refer to similar parts throughout the several views.

Referring in detail to the drawings, in order to illustrate this invention there is indicated the crawler type of tractor 10 having auxiliary frames 11 between which are mounted the drum gears 12 and 13 which are connected by the idler pinion 14. It is found desirable to operate these drums at different speeds with relation to the engine speed and at other times to stop same altogether. Especially is this the case when the power take off is intended to drive other machinery not provided with an independent clutch.

This device consists of a housing 15 whose flange 16 bolts to the power take off flange 17 and whose cover plate 18 provides easy access to the working parts.

The end wall 19 is provided with an outwardly turned flange 20 in which is mounted a bearing housing 21 under whose flange 22 is placed a shim 23. Inside of the housing 21 is placed a tapered roller bearing 24. In the wall 25 opposite the housing 21 is placed a bearing housing 26 under whose flange 27 is placed a shim 28. In the housing 26 is placed a tapered roller bearing 29. Within the bearings 24 and 29 is mounted a power delivery shaft 30 on whose steps 31 and 32 are mounted the large roller bearing gear 33 and the small roller bearing gear 34. The gears 33 and 34 are held between the collars 35 between which is placed the splined clutch collar 36 whose teeth 37 can engage the clutch teeth 38 of either gear 33 or 34. In the collar 36 is formed a groove 39.

On the rock shaft 40 is mounted a fork 41 whose pins 42 ride in the groove 39. The hand lever 43 on the shaft 40 is provided with a spring-urged pawl 44 which engages the notched segment 45 and holds the clutch collar 36 in either operative or neutral position.

On the projecting end of the shaft 30 is mounted a pinion 46 which is held in place by the nut 47 and meshes with the gear 12 of the drum 48. Obviously, the pinion 46 could be replaced with a sprocket, or a belt pulley or other element without departing from the spirit of this invention.

Directly below the shaft 30 is mounted a countershaft 49 whose gears 50 and 51 mesh at all times with the gears 33 and 34. The shaft 49 is mounted at each end in a tapered roller bearing 52 which, in turn, is confined in a housing 53 secured by bolts 54 to the sides 18 and 25. Shims 55 are also provided under the flanges of the housing 53 to provide lateral adjustment for the shaft 49. On the shaft 49 is also secured a bevel gear 56 which meshes with a second bevel gear 57 whose shaft 58 is supported by the double tapered roller bearings 59 between the hub of the gear 57 and the shoulder 60. The collar 61 holds the outer bearing 59 in place.

The shaft 58 is joined by the splined coupling 62 to the power shaft 63 of the tractor.

It can be seen by this construction that all that is necessary to do when installing this device is to remove the drive element with which the tractor is equipped and its bearing which forms a part of the attachment flange and substitute my device as a unit. All that is necessary to do is to provide a suitable driving element 46 for transmitting power to which every machine is to be operated.

It is preferable to provide a drain plug 64 in the bottom of the housing 15 for the flushing out of old lubricant. New lubricant can easily be inserted by removing the cover plate 18 or, if desired, a separate opening may be made thereafter, although it is highly desirable to keep the bear box closed at all times.

It can be seen by this construction that a very compact two-speed unit is thus obtainable, which also provides the additional feature of being able to completely cut off the rotation of the drive element by the operation of the lever 43 to a neutral position.

I claim:

An upright housing member having a rearwardly extending cylindrical flange provided with a shoulder at its forward end and having a vertical flange extending around said cylindrical flange whereby said housing can be attached to the body of a tractor, said housing having a removable cover over the top thereof; a pair of opposed tapered roller bearings shouldered in said cylindrical flange; a retaining flange for holding said bearings against their shoulder; a shouldered shaft passing through said bearings having its shoulder against one bearing and having a bevel gear secured on the end thereof against the other bearing; a transverse countershaft in said housing having a bevel gear secured thereto meshing with said first mentioned bevel gear; a pair of unequal spur gears secured on said countershaft on opposite sides of said second mentioned bevel gear; a power delivery shaft having loose gears mounted thereon meshing with said unequal gears, said loose gears having clutch teeth formed on their adjacent sides; and having a clutch collar splined on said power delivery shaft between said loose gears with lever means for moving and holding said collar into engagement with either gear or in a neutral position.

SIDNEY B. GORBUTT.